(12) United States Patent
Wu et al.

(10) Patent No.: US 11,728,899 B2
(45) Date of Patent: Aug. 15, 2023

(54) INDIVIDUALLY ROUTABLE SUBCARRIERS

(71) Applicant: Infinera Corporation, San Jose, CA (US)

(72) Inventors: Kuang-Tsan Wu, Ottawa (CA); Matthew L. Mitchell, Monte Sereno, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/561,830

(22) Filed: Dec. 24, 2021

(65) Prior Publication Data

US 2022/0116119 A1   Apr. 14, 2022

Related U.S. Application Data

(60) Division of application No. 16/870,502, filed on May 8, 2020, now Pat. No. 11,362,738, which is a (Continued)

(51) Int. Cl.
*H04B 10/61* (2013.01)
*H04B 10/40* (2013.01)
(Continued)

(52) U.S. Cl.
CPC .......... *H04B 10/614* (2013.01); *H04B 10/40* (2013.01); *H04B 10/503* (2013.01);
(Continued)

(58) Field of Classification Search
None
See application file for complete search history.

(56) References Cited

U.S. PATENT DOCUMENTS

| 2003/0025971 A1* | 2/2003 | Price | H04B 10/2575 398/183 |
| 2003/0058497 A1* | 3/2003 | Park | H04B 10/25133 398/82 |

(Continued)

*Primary Examiner* — Darren E Wolf
(74) *Attorney, Agent, or Firm* — David L. Soltz

(57) ABSTRACT

Consistent with an aspect of the present disclosure, electrical signals or digital subcarriers are generated in a DSP based on independent input data streams. Drive signals are generated based on the digital subcarriers, and such drive signals are applied to an optical modulator, including, for example, a Mach-Zehnder modulator. The optical modulator modulates light output from a laser based on the drive signals to supply optical subcarriers corresponding to the digital subcarriers. These optical subcarriers may be received by optical receivers provided at different locations in an optical communications network, where the optical subcarrier may be processed, and the input data stream associated with such optical subcarrier is output. Accordingly, instead of providing multiple lasers and modulators, for example, data is carried by individual subcarriers output from an optical source including one laser and modulator. Thus, a cost associated with the network may be reduced. Moreover, each of the subcarriers may be detected by a corresponding one of a plurality of receivers, each of which being provided in a different location in the optical communication network. Thus, receivers need not be co-located, such that the network has improved flexibility.

10 Claims, 8 Drawing Sheets

Related U.S. Application Data continuation of application No. 16/155,624, filed on Oct. 9, 2018, now Pat. No. 10,742,328.

(60) Provisional application No. 62/569,847, filed on Oct. 9, 2017.

(51) Int. Cl.
*H04J 14/06* (2006.01)
*H04B 10/50* (2013.01)
*H04B 10/548* (2013.01)
*H04B 10/54* (2013.01)
*H04J 14/02* (2006.01)
*H04B 10/67* (2013.01)
*H04B 10/69* (2013.01)

(52) U.S. Cl.
CPC ......... *H04B 10/541* (2013.01); *H04B 10/548* (2013.01); *H04B 10/612* (2013.01); *H04B 10/616* (2013.01); *H04B 10/675* (2013.01); *H04B 10/69* (2013.01); *H04J 14/0298* (2013.01); *H04J 14/06* (2013.01)

(56) References Cited

U.S. PATENT DOCUMENTS

| | | | | |
|---|---|---|---|---|
| 2004/0208614 | A1* | 10/2004 | Price | H04B 10/505 398/152 |
| 2006/0280510 | A1* | 12/2006 | Onaka | H04B 10/60 398/188 |
| 2009/0238578 | A1* | 9/2009 | Taylor | H04B 10/6972 398/147 |
| 2010/0172649 | A1* | 7/2010 | Graves | H04B 10/1123 398/118 |
| 2012/0154783 | A1* | 6/2012 | Goldberg | G01S 7/4812 385/33 |
| 2013/0286847 | A1* | 10/2013 | Schmidt | H04B 10/65 398/43 |
| 2018/0175963 | A1* | 6/2018 | Soto | H04J 14/0221 |

* cited by examiner

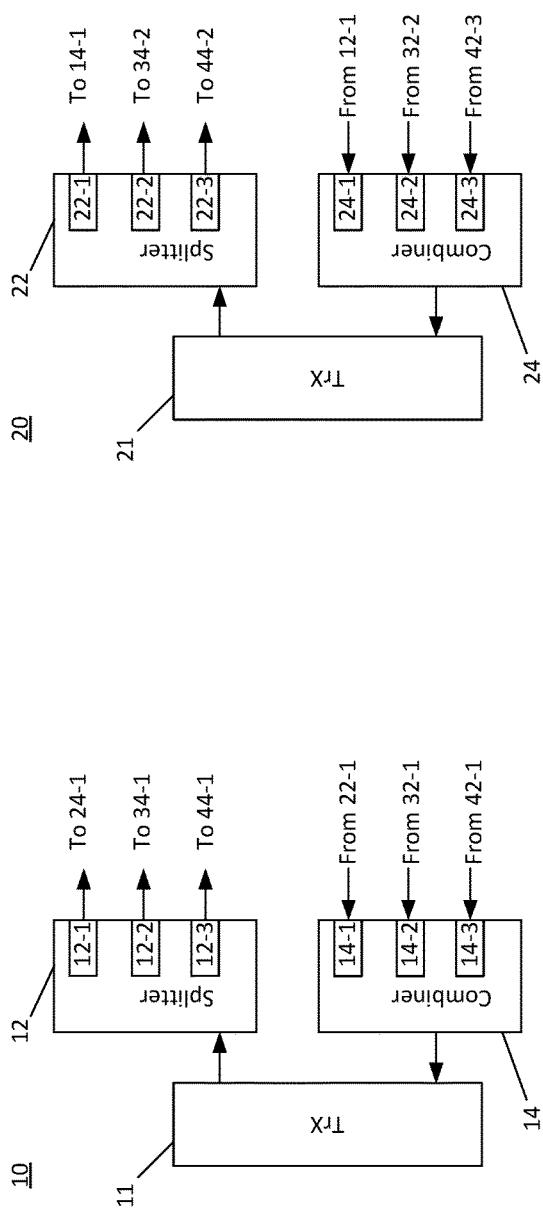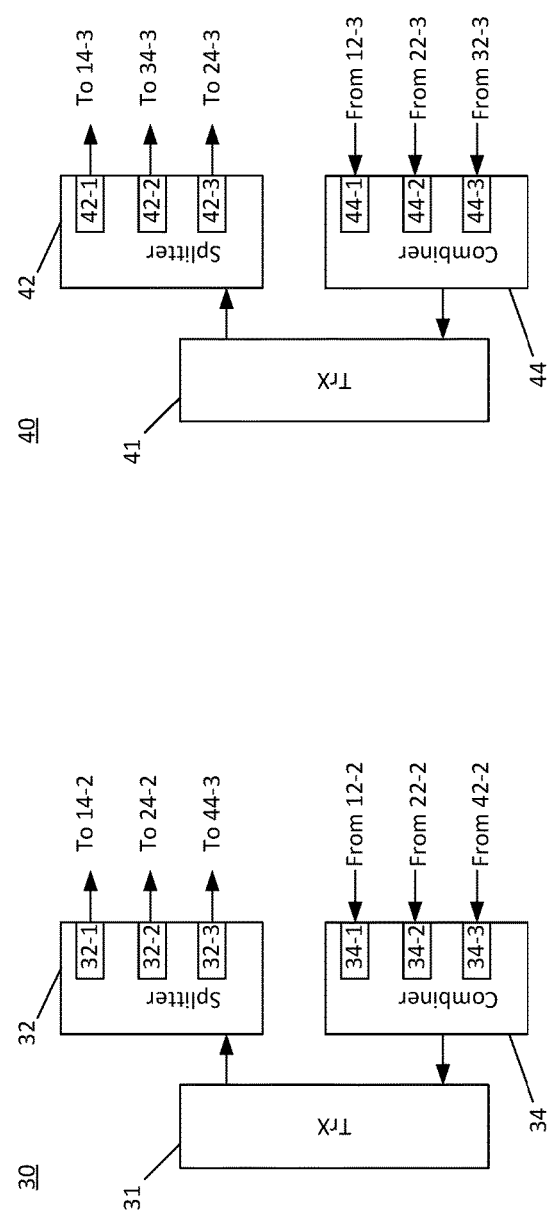
Fig. 2

INDIVIDUALLY ROUTABLE SUBCARRIERS

This application is a divisional of U.S. Ser. No. 16/870,502, which is a continuation of U.S. Ser. No. 16/155,624, filed Oct. 9, 2018, which claims priority under 35 U.S.C. § 119 to U.S. Provisional Patent Application No. 62/569,847, filed on Oct. 9, 2017, the entire content of each of which is incorporated by reference herein in its entirety.

Optical communication systems are known in which multiple optical signals, each having a corresponding wavelength, and each being modulated to carry a different data stream, are multiplexed onto an optical fiber. In such systems, a laser and a modulator may be used to generate each optical signal. Accordingly, in order to increase the capacity of such systems, additional lasers, modulators and associated circuitry are employed. The cost associated with such systems may therefore increase, as capacity is increased. Accordingly, there is a need for a more cost-effective network requiring fewer components, such as those described above.

SUMMARY

Consistent with an aspect of the present disclosure, an apparatus is provided that comprises a digital signal processor that receives a plurality of independent data streams, the digital signal processor supplying outputs based on the plurality of independent data streams. In addition, a laser is provided, as well as a modulator that outputs a modulated optical signal based on the plurality of outputs. The optical signal including a plurality of Nyquist subcarriers based on the outputs of the digital signal processor, wherein a first one of the plurality of Nyquist subcarriers carries data indicative of a first one of the plurality of independent data streams, and a second one of the plurality of Nyquist subcarriers carries data indicative of a second one of the plurality of independent data streams.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) and together with the description, serve to explain the principles of the invention.

BRIEF DESCRIPTION OF THE DRAWINGS

FIG. 2 illustrates each node shown in FIG. 1 in greater detail;

FIG. 3b illustrates an example of a transmitter portion of the transceiver shown in FIG. 3a;

DESCRIPTION OF THE EMBODIMENTS

Consistent with an aspect of the present disclosure, electrical signals or digital subcarriers are generated in a DSP based on independent input data streams. Drive signals are generated based on the digital subcarriers, and such drive signals are applied to an optical modulator, including, for example, a Mach-Zehnder modulator. The optical modulator modulates light output from a laser based on the drive signals to supply optical subcarriers corresponding to the digital subcarriers. These optical subcarriers may be received by optical receivers provided at different locations in an optical communications network, where the optical subcarrier may be processed, and the input data stream associated with such optical subcarrier is output. Accordingly, instead of providing multiple lasers and modulators, for example, data is carried by individual subcarriers output from an optical source including one laser and modulator. Thus, a cost associated with the network may be reduced. Moreover, each of the subcarriers may be detected by a corresponding one of a plurality of receivers, each of which being provided in a different location in the optical communication network. Thus, receivers need not be co-located, such that the network has improved flexibility.

Reference will now be made in detail to the present embodiment(s) (exemplary embodiments) of the present disclosure, an example(s) of which is (are) illustrated in the accompanying drawings. Wherever possible, the same reference numbers will be used throughout the drawings to refer to the same or like parts.

Figure 1:
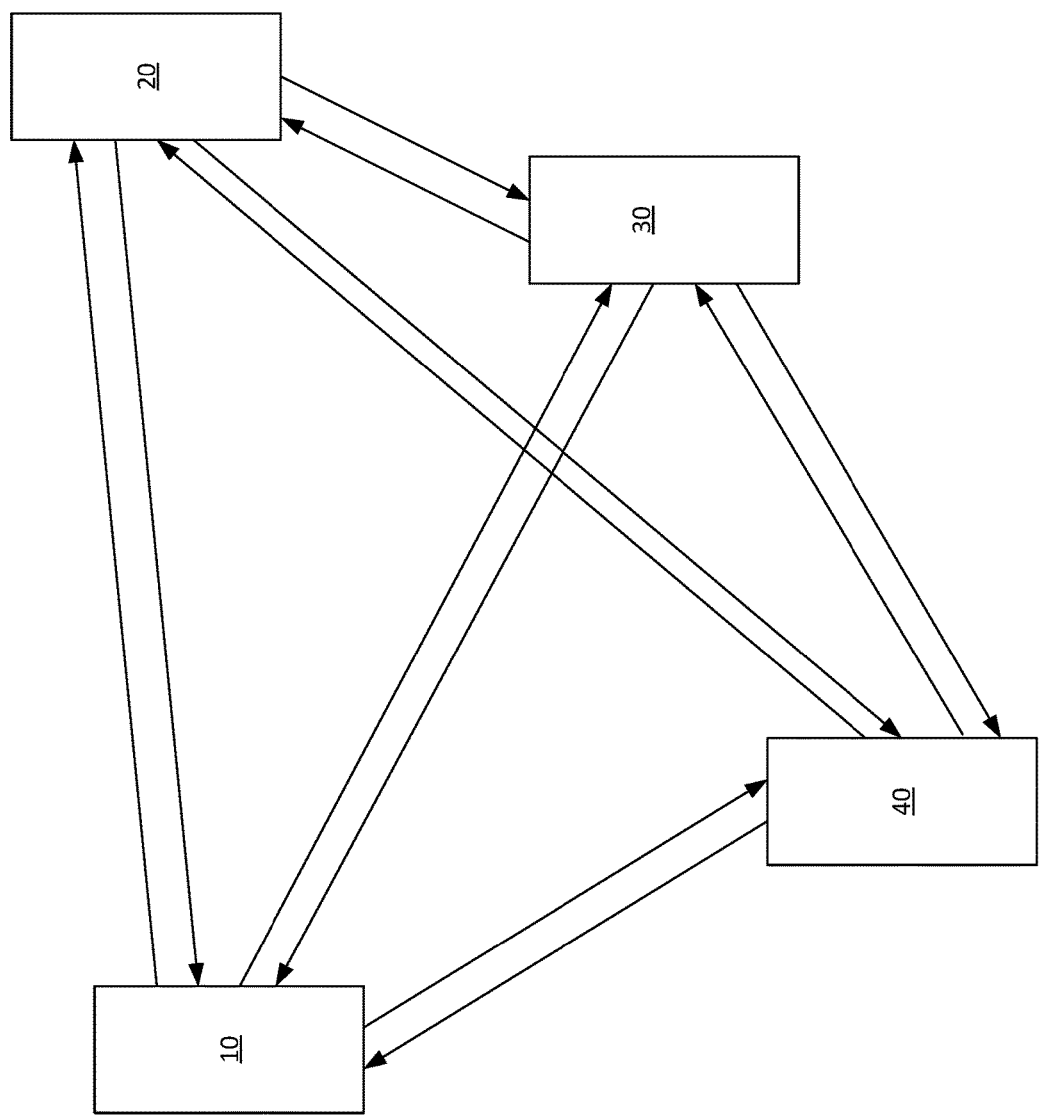
FIG. 1 illustrates a block diagram of a mesh network consistent with an aspect of the present disclosure.

FIG. 1 illustrates a block diagram of a mesh network 100 including nodes 10, 20, 30, and 40 consistent with an aspect of the present disclosure. As discussed in greater detail below, optical transmitters and receivers further consistent with the present disclosure may be provided in each node to reduce network cost and improved network flexibility. As shown in FIG. 1, each of nodes 10, 20, 30, and 40 may communicate with another one of these nodes.

FIG. 2 shows each of nodes 10, 20, 30, and 40 in greater detail. In one example, each node includes a respective transceiver, such that node 10 includes transceiver 11, node 20 includes transceiver 21, node 30 includes transceiver 31, and node 40 includes transceiver 41. Transceiver 11 may include an output that supplies modulated optical signals to a splitter 12, which, in turn, has a plurality of outputs or ports 12-1, 12-2, and 12-3. Each of these ports may provide a power split portion of the input modulated optical signal to the splitter 12. As discussed in greater detail below, the modulated optical signal may include a plurality of subcarriers. Such subcarriers may be Nyquist subcarriers.

Node 10 may also include an optical combiner 14 that receives power split portions of modulated optical signals from other nodes 20, 30, and 40 (described below) at inputs or ports 14-1, 14-2, and 14-3 and supplies the combined portions as an input to transceiver 11.

Transceiver 21 of node 20 may include an output that supplies modulated optical signals to a splitter 22, which, in turn, has a plurality of outputs or ports 22-1, 22-2, and 22-3. Each of these ports may provide a power split portion of the input modulated optical signal to splitter 22.

Node 20 may also include an optical combiner 24 that receives power split portions of modulated optical signals from other nodes 10, 30, and 40 (described below) at inputs or ports 24-1, 24-2, and 24-3 and supplies the combined portions as an input to transceiver 21.

Transceiver 31 of node 30 may include an output that supplies modulated optical signals to a splitter 32, which, in turn, has a plurality of outputs or ports 32-1, 32-2, and 32-3. Each of these ports may provide a power split portion of the input modulated optical signal to splitter 32.

Node 30 may also include an optical combiner 34 that receives power split portions of modulated optical signals from other nodes 10, 20, and 40 (described below) at inputs or ports 34-1, 34-2, and 34-3 and supplies the combined portions as an input to transceiver 31.

Transceiver 41 of node 40 may include an output that supplies modulated optical signals to a splitter 42, which, in turn, has a plurality of outputs or ports 42-1, 42-2, and 42-3. Each of these ports may provide a power split portion of the input modulated optical signal to splitter 42.

Node 40 may also include an optical combiner 44 that receives power split portions of modulated optical signals from other nodes 10, 20, and 30 (described below) at inputs or ports 44-1, 44-2, and 44-3 and supplies the combined portions as an input to transceiver 41.

Table 1 below lists the outputs of each splitter and corresponding combiner inputs optically coupled to such splitter outputs for mesh network 100.

TABLE 1

| Splitter Output | Combiner Input |
|---|---|
| 12-1 | 24-1 |
| 12-2 | 34-1 |
| 12-3 | 44-1 |
| 22-1 | 14-1 |
| 22-2 | 34-2 |
| 22-3 | 44-2 |
| 32-1 | 14-2 |
| 32-1 | 24-2 |
| 32-3 | 44-3 |
| 42-1 | 14-3 |
| 42-2 | 34-3 |
| 42-3 | 24-3 |

Accordingly, as shown in Table 1, as well as in FIG. 2, a power split portion of the modulated optical signal (including a power split portion of each optical subcarrier included therein) is output from each of ports 12-1, 12-2, and 12-3 of splitter 12 (Node 1) to a corresponding one of input ports 24-1 (node 20), 34-1 (node 30), and 44-1 (node 40), respectively. In another example, a power split portion of the modulated optical signal (including a power split portion of each optical subcarrier included therein) is output from each of ports 32-1, 32-2, and 32-3 of splitter 32 (Node 1) to a corresponding one of input ports 14-2 (node 10), 24-2 (node 20), and 44-3 (node 40), respectively. Similar connections are also made between the splitters and combiners of nodes 20 and 40.

Figure 3A:
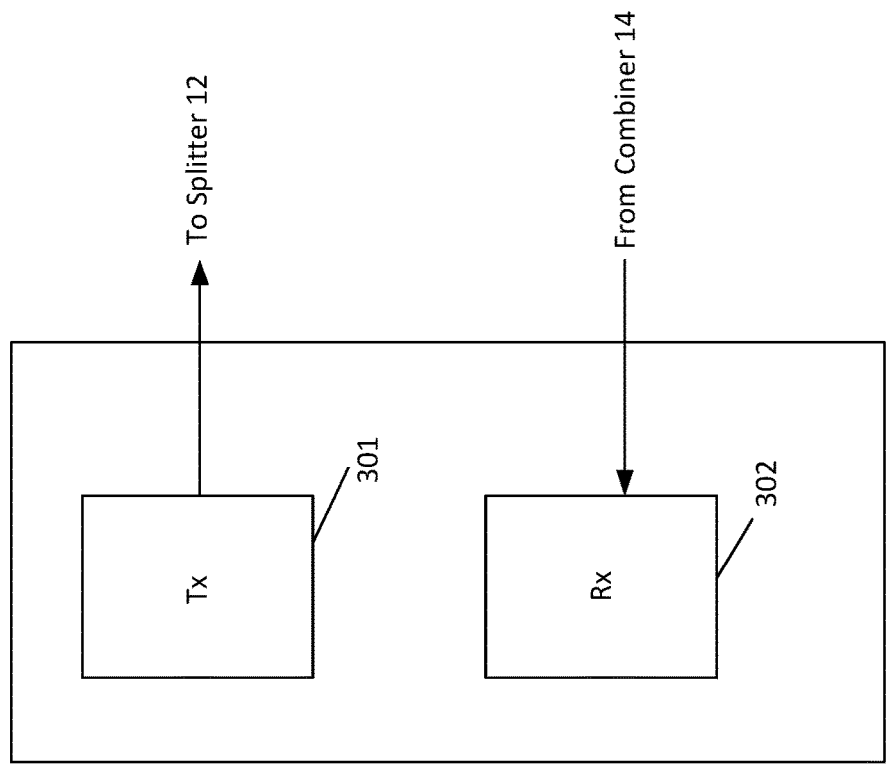
FIG. 3a illustrates a block diagram of a transceiver consistent with an aspect of the present disclosure.

FIG. 3a shows an example of transceiver 11. It is understood that transceivers 21, 31, and 41 may have the same or similar structure as transceiver 11. Transceiver 11 may include an optical transmitter circuit 301 that supplies modulated optical signals to splitter 12. Transceiver 11 may also include a receiver circuit 302 that receives the optical output from combiner 302, for example. The receiver and transmitter circuits may be housed together on the same card and/or housing or may be provided in separate housings.

Figure 3B:
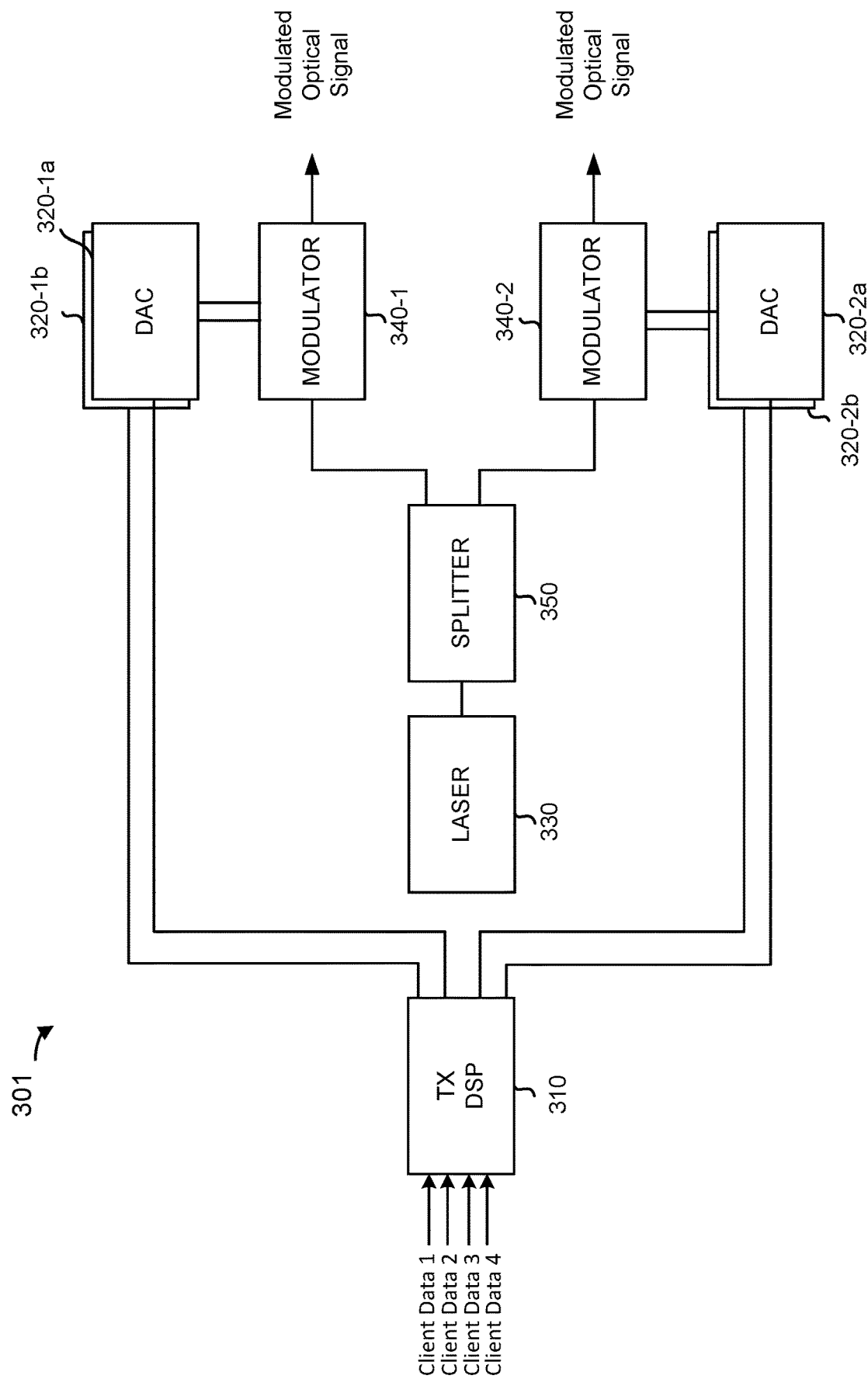

FIG. 3b shows transmitter circuit 301 in greater detail. Optical transmitter 301 may include a TX DSP 310, DACs 320-1a,1b and 320-2a,b (referred to generally as DACs 320 and individually as DAC 320), a laser 330, modulators 340-1 and 340-2 (referred to generally as modulators 340 and individually as modulator 340), and splitter 350. TX DSP 310, DACs 320, laser 330, and modulators 340.

Splitter 350 may include an optical splitter that receives continuous wave (CW) light, for example, from laser 330 and splits such light into two branches or portions: one for a first polarization (e.g., transverse electric, TE) and one for the second polarization (e.g., transverse magnetic, TM). In some implementations, the two light portions may have approximately equal power. Splitter 350 may output one light portion to modulator 340-1 and another light portion to modulator 340-2.

Modulator 340-1 may be used to modulate signals of the first polarization. Modulator 340-2 may be used to modulate signals for the second polarization. It is noted, however, that generally the light output form laser 330 has one polarization, e.g., the first polarization, such that both modulators 340 provide modulated optical signal having the same polarization. Accordingly, a polarization rotator may be provided at the input or the output of one of modulators 340, so that the polarization of one of the modulated optical signals is rotated. A polarization beam combiner may also be provided to multiplex the polarization rotated and unrotated modulated optical signals.

In some implementations, two DACs 320 (320) may be associated with each polarization. In these implementations, two DACs 320-1a,b may supply voltage signals to modulator 340-1, and two DACs 320-2a,b may supply voltage signals to modulator 340-2. The outputs of modulators 340 may be combined back together using combiners (e.g., optical multiplexer 216) and polarization multiplexing, as noted above.

While FIG. 3b shows optical transmitter 301 as including a particular quantity and arrangement of components, in some implementations, optical transmitter 212 may include additional components, fewer components, different components, or differently arranged components. The quantity of DACs 320, lasers 330, and/or modulators 340 may be selected to implement an optical transmitter 301 that is capable of generating polarization diverse signals for transmission on an optical fiber, such as a link between a pair of nodes in network 100 (see FIG. 1). In some instances, one of the components illustrated in FIG. 3b may perform a function described herein as being performed by another one of the components illustrated in FIG. 3b.

Figure 4:
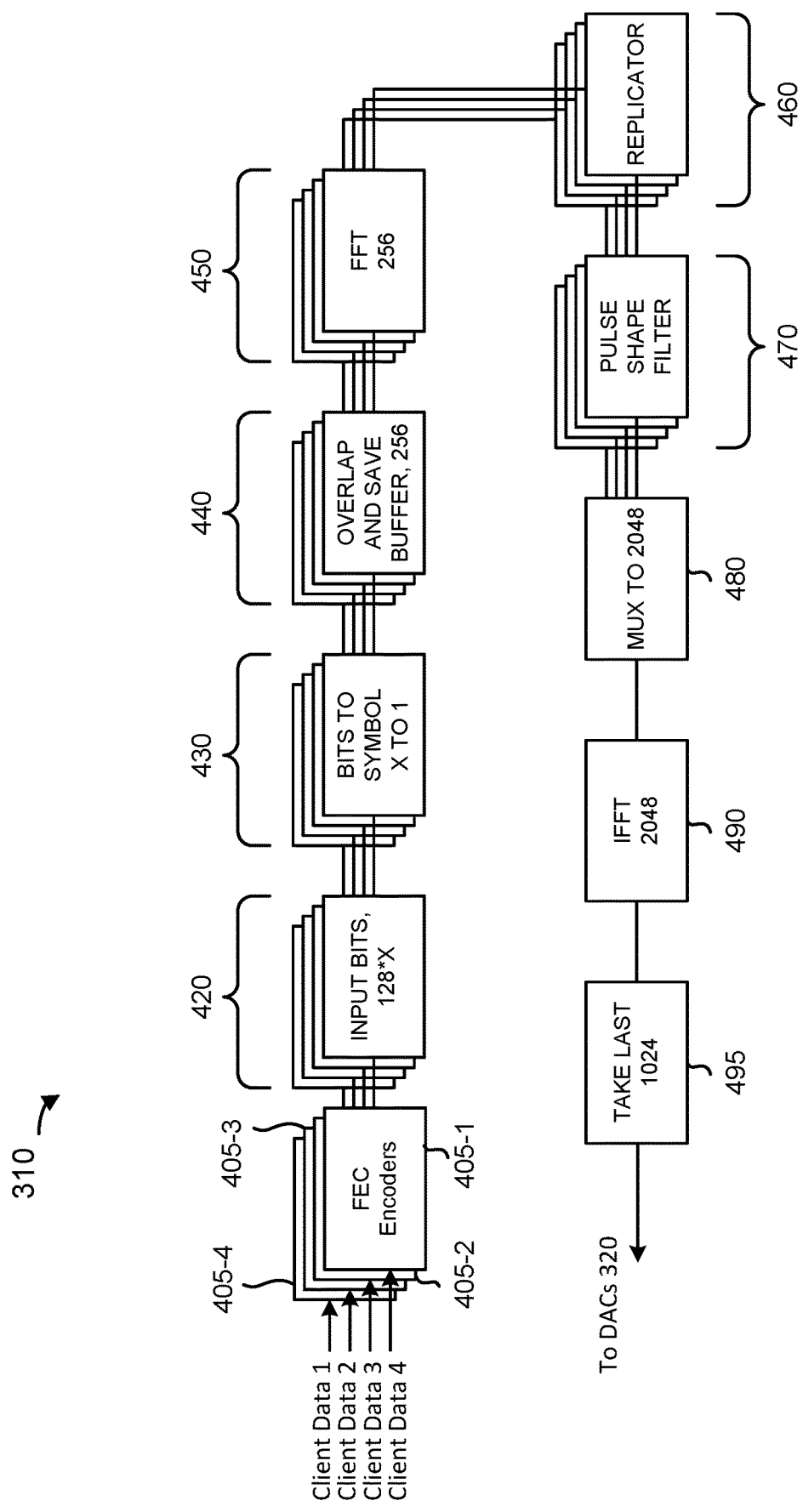
FIG. 4 illustrates an example of a digital signal processor (DSP) consistent with a further aspect of the present disclosure.
Figure 5:
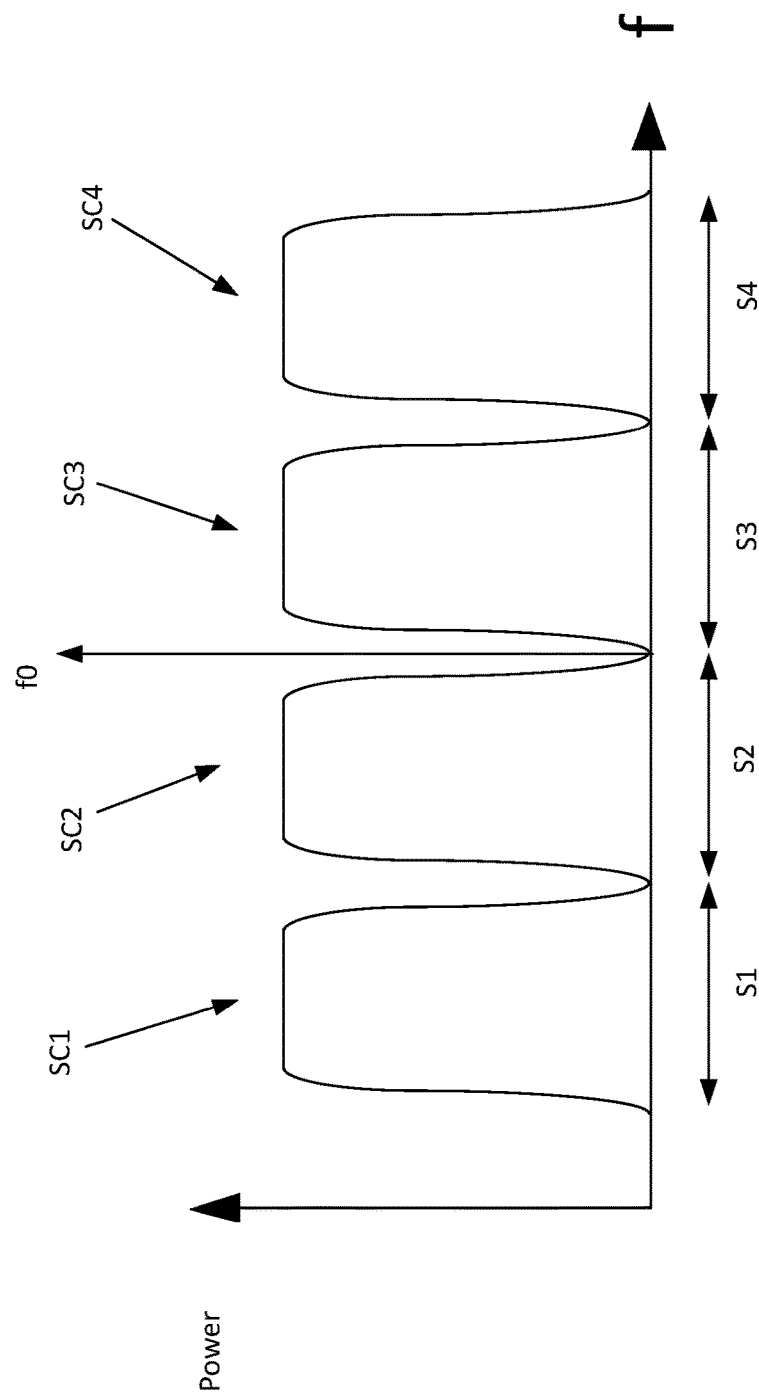
FIG. 5 illustrates a plurality of Nyquist subcarriers consistent with an aspect of the present disclosure.

FIG. 4 shows an example of a DSP 310 in greater detail. As shown in FIG. 5, TX DSP 310 may include an FEC encoders 405-1 to 405-4, a de-mux component 410, an input bits component 420, a bits to symbol component 430, an overlap and save buffer 440, a fast Fourier transform functions (FFT) component 450, a replicator component 460, a pulse shape filter 470, a mux component 480, an inverse FFT (IFFT) component 490, and a take last 1024 component 495.

Each of FEC encoders 405-1 to 405-4 may receive a plurality of independent input data streams of bits (Client Data 1-4) from a respective one of a plurality of data sources and perform error correction coding on a corresponding one of the input data streams, such as through the addition of parity bits. FEC encoders 405-1 to 405-4 may be designed to generate timing skew between the subcarriers to correct for skew induced by link between nodes 10, 20, 30, and 40 in network 100. De-mux component 410 may provide each group of bits to a corresponding input bits component 420. Input bits component 420 may process 128*X bits at a time, where X is an integer. For dual-polarization Quadrature Phase Shift Keying (QPSK), X is four. For higher modulation formats, X may be more than four. For example, for an 8-quadrature amplitude modulation (QAM) format, X may be eight and for a 16 QAM modulation format, X may be 16. Accordingly, for such 8 QAM modulation, eight FEC encoders may be provided, each of which may encode a respective one of eight independent input data streams for a corresponding one of eight subcarriers. Likewise, for 16 QAM modulation, sixteen FEC encoders may be provided, each of which may encode a respective one of sixteen independent input data streams for a corresponding one of sixteen subcarriers.

Bits to symbol component 430 may map the bits to symbols on the complex plane. For example, bits to symbol component 430 may map four bits to a symbol in the dual-polarization QPSK constellation. Overlap and save buffer 440 may buffer 256 symbols. Overlap and save buffer 440 may receive 128 symbols at a time from bits to symbol component 430. Thus, overlap and save buffer 440 may combine 128 new symbols, from bits to symbol component 430, with the previous 128 symbols received from bits to symbol component 430.

FFT component 450 may receive 256 symbols from overlap and save buffer 440 and convert the symbols to the frequency domain using, for example, a fast Fourier transform (FFT). FFT component 450 may form 256 frequency bins as a result of performing the FFT. Replicator component 460 may replicate the 256 frequency bins or registers to form 512 frequency bins (e.g., for T/2 based filtering of the subcarrier). This replication may increase the sample rate.

Pulse shape filter 470 may apply a pulse shaping filter to the data stored in the 512 frequency bins to thereby provide the digital subcarriers which are multiplexed and subject to an inverse FFT, as described below. The purpose of pulse shape filter 470 is to calculate the transitions between the symbols and the desired spectrum so that the subcarriers can be packed together on the channel. Pulse shape filter 470 may also be used to introduce timing skew between the subcarriers to correct for timing skew induced by links between nodes 10, 20, 30, and 40 in network 100. Mux component 480 may receive all four, eight Gbaud subcarriers (from the four pulse shape filters 470) and multiplex them together to form a 2048 element vector.

IFFT component 490 may receive the 2048 element vector and return the signal back to the time domain, which may now be at 64 GSample/s. IFFT component 490 may convert the signal to the time domain using, for example, an inverse fast Fourier transform (IFFT). Take last 1024 component 495 may select the last 1024 samples from IFFT component 490 and output the 1024 samples to DACs 320 at 64 GSample/s, for example.

While FIG. 4 shows TX DSP 310 as including a particular quantity and arrangement of functional components, in some implementations, TX DSP 310 may include additional functional components, fewer functional components, different functional components, or differently arranged functional components.

FIG. 5 illustrates an example of subcarriers SC1 to SC4 that may be output from transmitter 11 (similar subcarriers may be output from transmitters in transceivers located at other nodes). As shown in FIG. 5, subcarriers SC1 to SC4 may not spectrally overlap with one another and may be, for example, Nyquist subcarriers, which may have a frequency spacing equal to or slightly larger than the individual subcarrier baud-rate.

As further shown in FIG. 5, subcarriers may have spectra or bandwidths, S3 (subcarrier SC3) and S4 (subcarrier SC4) above frequency f0, which may correspond to a center frequency of the laser (e.g., laser 508). In addition, subcarriers may have spectra or bandwidths, S1 (subcarrier SC1) and S2 (subcarrier SC2) below frequency f0. In one example, the number of subcarriers equals a number of the independent input data streams, such as, in the present example (Client Data 1 to 4—four independent input data streams and SC1 to SC4—four subcarriers).

As noted above, in one example, subcarriers output from transmitter 301 may be supplied to splitter 12, which may have ports that supply a power split portion of each subcarrier to a corresponding combiner input port at another node, such as combiner input port 24-1 at node 20, combiner input port 34-1 of node 30, and combiner input port 44-1 of node 40. Each combiner (14, 24, 34, and 44) at each node combines power split subcarrier portions from selected splitter output ports of other nodes. The combiner at each node combines such power split subcarrier portions and supplies the combined subcarriers to a receiver, such as receiver 302, which may select data carried by one of such subcarriers, as described in greater detail below with reference to FIGS. 6 and 7.

Figure 6:
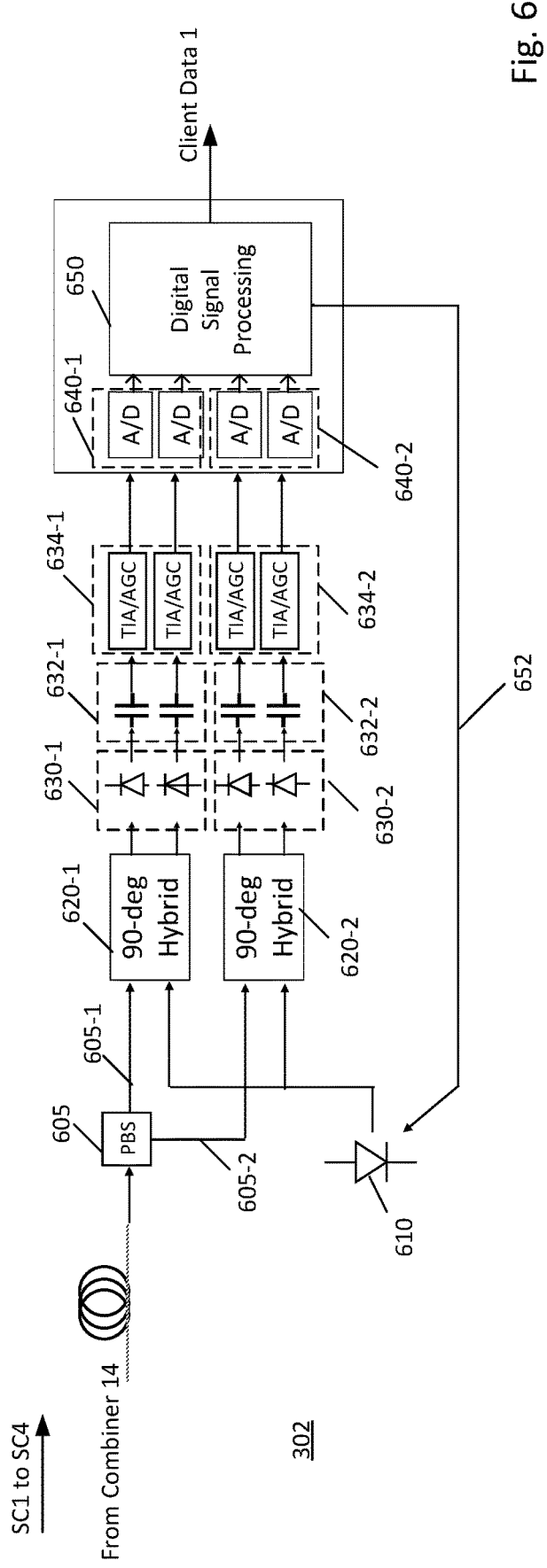
FIG. 6 shows an example of a receiver consistent with an aspect of the present disclosure.

As shown in FIG. 6, optical receiver 301 may include a polarization splitter 605 (having first (605-1) and second (605-2) outputs), a local oscillator laser 610, 90 degree optical hybrids or mixers 620-1 and 620-2 (referred to generally as hybrid mixers 620 and individually as hybrid mixer 620), detectors 630-1 and 630-2 (referred to generally as detectors 630 and individually as detector 630, each including either a single photodiode or balanced photodiode), AC coupling capacitors 632-1 and 632-2, transimpedance amplifiers/automatic gain control circuits TIA/AGC 634-1 and 634-2, ADCs 640-1 and 640-2 (referred to generally as ADCs 640 and individually as ADC 640), and an RX DSP 650. Local oscillator 610, hybrid mixers 620, detectors 630, ADCs 640, and RX DSP 650 may correspond to like components described with regard to FIG. 6.

Polarization beam splitter (PBS) 605 may include a polarization splitter that splits an input signal into two orthogonal polarizations, such as the first polarization and the second polarization. Hybrid mixers 620 may combine the polarization signals with light from local oscillator laser 610. For example, hybrid mixer 620-1 may combine a first polarization signal (e.g., the component of the incoming optical signal having a first or TE polarization output from PBS port 605-1) with the optical signal from local oscillator 610, and hybrid mixer 620-2 may combine a second polarization signal (e.g., the component of the incoming optical signal having a second or TM polarization output from PBS port 605-2) with the optical signal from local oscillator 610. In one example, a polarization rotator may be provided at PBS output 605-2 to rotate the second polarization to be the first polarization.

Detectors 630 may detect mixing products output from the optical hybrids, to form corresponding voltage signals, which are subject to AC coupling by capacitors 632-1 and 632-1, as well as amplification and gain control by TIA/AGCs 634-1 and 634-2. The outputs of TIA/AGCs 634-1 and 634-2 and ADCs 640 may convert the voltage signals to digital samples. For example, two detectors or photodiodes 630-1 may detect the first polarization signals to form the corresponding voltage signals, and a corresponding two ADCs 640-1 may convert the voltage signals to digital samples for the first polarization signals after amplification, gain control and AC coupling. Similarly, two detectors 630-2 may detect the second polarization signals to form the corresponding voltage signals, and a corresponding two ADCs 640-2 may convert the voltage signals to digital samples for the second polarization signals after amplification, gain control and AC coupling. RX DSP 650 may process the digital samples for the first and second polarization signals to generate resultant data, which may be outputted as output data.

While FIG. 6B shows optical receiver 302 as including a particular quantity and arrangement of components, in some implementations, optical receiver 302 may include additional components, fewer components, different components, or differently arranged components. The quantity of detectors 630 and/or ADCs 640 may be selected to implement an optical receiver 302 that is capable of receiving a polarization diverse signal. In some instances, one of the components illustrated in FIG. 6 may perform a function described herein as being performed by another one of the components illustrated in FIG. 6.

Consistent with the present disclosure, in order to select a particular subcarrier at a remote node, local oscillator 610 may be tuned to output light having a wavelength relatively close to the selected subcarrier wavelength to thereby cause a beating between the local oscillator light and the selected subcarrier. Such beating will either not occur or will be significantly attenuated for the other non-selected subcarriers so that data carried by the selected subcarrier is detect and processed by DSP 650. In the example shown in FIG. 6, appropriate tuning of the local oscillator wavelength enables selection of one of the subcarriers, e.g., SC1, carrying signals or data indicative of Client Data 1. Accordingly, subcarriers may be effectively routed through network 100 to a desired receiver in a particular node.

Accordingly, at each node receiver, such as receiver 302, which may be included in nodes 10, 20, 30, and 40, the local oscillator laser, e.g., 610, may be tuned to have a wavelength close to that of one of the subcarrier carrying signals and data indicative of the desired client data to be output from the DSP, e.g., DSP 650. Such tuning may be achieved by adjusting a temperature or current flowing through local oscillator 610, which may include a semiconductor laser, such as a distributed feedback (DFB) laser or distributed Bragg reflector (DBR) laser. Thus, different optical components in each receiver to select optical signals carrying a desired data stream are not required. Rather, as noted above, the same or substantially the same circuitry may be proved in the receiver portion of each node, such as a node in a mesh network, and signal or data selection may be achieved by tuning the local oscillator laser to the desired beating wavelength.

As further shown in FIG. 6, DSP 650 may have an output 652, such that based on such output, the temperature of or the current supplied to local oscillator laser 610 may be controlled. In the case of temperature control, a thin film heater may be provided adjacent local oscillator laser 610, and an appropriate current may be supplied to such heater, based on output 652, to heat laser 610 to the desired temperature. Control circuitry in DSP 650 may generate output or control signal 652. Alternatively, such circuitry may be provided outside DSP 650.

A receiver 700 consistent with an additional aspect of the present disclosure will next be described with reference to FIG. 7. Receiver 700 may include an optical filter 702 configured to receive optical signals from either PBS output 702-1 or 702-2. In one example, optical filter 702 may be configured to pass the desired subcarrier, e.g., SC1, while blocking the remaining subcarriers transmitted with SC1, as well as other subcarriers other subcarriers transmitted from other nodes. Optical filter 702 may include, for example, a wavelength selective switch (WSS), arrayed waveguide grating (AWG), Bragg grating, and/or a dichroic filter.

Figure 7:
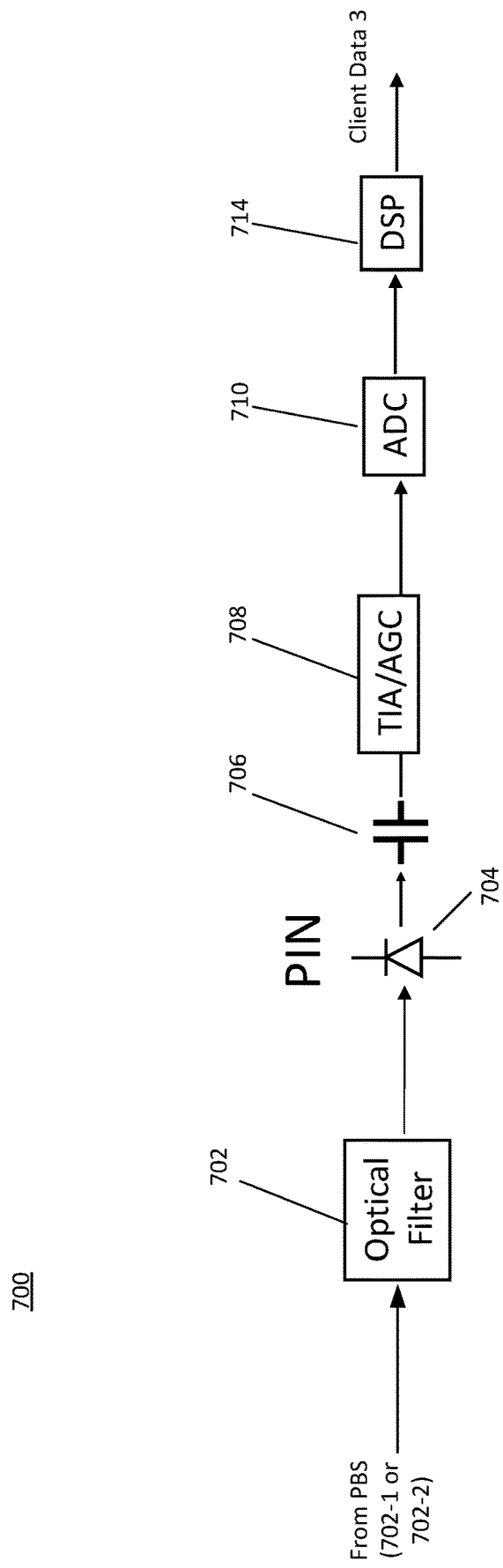
FIG. 7 illustrates another example of a receiver consistent with a further aspect of the present disclosure.

As further shown in FIG. 7, the selected optical subcarrier may be supplied to a PIN photodiode 704, for example, which converts the received optical subcarrier to an electrical signal. The electrical signal may then be subject to AC coupling by capacitor 706 and amplification and automatic gain control by TIA/AGC 708, followed by conversion to digital samples in 710 and digital signal processing by DSP 714 to output the data carried by the selected subcarrier, e.g., Client Data 3. In the example shown in FIG. 7, however, DSP 714 is optional. DSP 714 may include circuitry for carrying out feedforward equalization (FFE), decision feedback equalization (DFE) or maximum likelihood sequence estimate (MLSE) equalization.

In the example discussed above in connection with FIG. 6, the optical signals are subject to coherent detection of QPSK or QAM modulated optical signals. Consistent with a further aspect of the present disclosure, DSP 310 appropriately configured in conjunction with DACs 320 may operate to supply drive signals to modulators 340, such that the modulator outputs intensity modulated optical subcarriers, such as. Such subcarriers are then sensed with the direct detection, as shown in FIG. 7 whereby the optical subcarrier is supplied to a photodiode, as opposed to be mixing with local oscillator light, as in the coherent detection scheme shown in FIG. 6.

Consistent with an additional aspect of the present disclosure, based on an appropriate configuration of DSP 310 in conjunction with the laser, modulators and other circuitry discussed above, certain subcarriers (e.g., SC1 and SC3) may be intensity modulated, a pulse amplitude modulation (PAM, such as PAM-4), for example while others (SC2 and SC4, for example) may be modulated in accordance with binary phase shift keying (BPSK), QPSK, or m-QAM modulation formats, where m is an integer. In addition, certain subcarriers (e.g., SC1 and SC3) may be modulated in accordance with a first QAM modulation format, such as one of BPSK, QPSK, 16-QAM, 64-QAM, 256-QAM or some other m-QAM modulation format while other subcarriers (e.g., SC2 and SC4) may be modulated in accordance with a second modulation format. Moreover, each subcarrier may be modulated to carry data at different rates, e.g., subcarrier SC1 may carry data at a first rate and subcarrier SC2 may carry data at a different rate that is higher or lower than the first rate. In addition, each subcarrier may be modulated to carry data with different baud rates, e.g., subcarrier SC1 may carry data at or have an associated a first baud rate and subcarrier SC2 may carry data at or have an associated second baud rate that is higher or lower (different) than the first baud rate.

Accordingly, as noted above, a simplified and less expensive transmitter may be realized consistent with the present disclosure in which a laser and modulator may be employed to generate multiple subcarriers, whereby each of which may be detected and the client data associated therewith may be output from receivers provided at different locations in a mesh network, for example. Improved network flexibility can therefor be achieved.

Other embodiments will be apparent to those skilled in the art from consideration of the specification. It is intended that the specification and examples be considered as exemplary only, with a true scope and spirit of the invention being indicated by the following claims.

What is claimed is:

1. A system, comprising:
  a transmitter including:
    a plurality of forward error correction encoders, each of which being operable to receive a respective one of a plurality of independent data streams and being operable to provide a corresponding one of a plurality of encoded signals,
    a digital signal processor operable to provide a plurality of digital signals based on the plurality of encoded signals a first modulator, including a first Mach-Zehnder modulator, operable to modulate light based on first ones of the plurality of digital signals to supply a first modulated optical signal, a second modulator, including a second Mach-Zehnder modulator operable to modulate light based on second ones of the plurality of digital signals to supply a second modulated optical signal, a polarization rotator operable to rotate a polarization of the first modulated optical signal, a polarization beam combiner operable to combine the second modulated optical signal and the polarization rotated first modulated optical signal to provide a combined modulated optical signal, the combined modulated optical signal including a plurality of Nyquist subcarriers, a first one of the plurality of Nyquist subcarriers carries data indicative of a first one of the plurality of independent data streams, and a second one of the plurality of Nyquist subcarriers carries data indicative of a second one of the plurality of independent data streams;

a first receiver operable to receive a first portion of a first one of the plurality of Nyquist subcarriers and a first portion of the second one of the plurality of Nyquist subcarriers, the first receiver being operable to process the first portion of the first one of the plurality of Nyquist subcarriers and being operable to output the first one the plurality of independent data streams; and a second receiver operable to receive a second portion of the first one of the plurality of Nyquist subcarriers and a second portion of the second one of the plurality of Nyquist subcarriers, the second receiver being operable to process the second portion of the second one of the plurality of Nyquist subcarriers and being operable to output the second one the plurality of independent data streams.

2. An apparatus in accordance with claim 1, wherein a number of the plurality of Nyquist subcarriers equals a number of the plurality of independent data streams.

3. An apparatus in accordance with claim 1, wherein each of the plurality of Nyquist subcarriers is modulated in accordance with the same modulation format.

4. An apparatus in accordance with claim 1, wherein a first one of the plurality of Nyquist subcarriers carries first data with a first data rate and a second one of the plurality of Nyquist subcarriers carries second data with a second data rate different than the first data rate.

5. An apparatus in accordance with claim 1, wherein a first one of the plurality of Nyquist subcarriers has an associated first baud rate and a second one of the plurality of subcarriers has an associated second baud rate different than the first baud rate.

6. An apparatus in accordance with claim 1, wherein the modulator includes Mach-Zehnder modulator.

7. An apparatus in accordance with claim 1, wherein a first one of the plurality of Nyquist subcarriers is modulated in accordance with a first modulation format and a second one of the plurality of Nyquist subcarriers is modulated in accordance with a second modulation format different than the first modulation format.

8. An apparatus in accordance with claim 7, wherein the first modulation format is one of BPSK, QPSK, and m-QAM, where m is an integer, and the second modulation format is another one of BPSK, QPSK, and m-QAM.

9. An apparatus in accordance with claim 7, wherein the first modulation format is one of BPSK, QPSK, and m-QAM, where m is an integer, and the second modulation format is an intensity modulation format.

10. An apparatus in accordance with claim 9, wherein the intensity modulation format is a pulse amplitude (PAM) modulation format.

* * * * *